Jan. 7, 1941. C. H. BISSELL 2,227,954
CONDUIT SEALING FITTING
Filed March 8, 1940
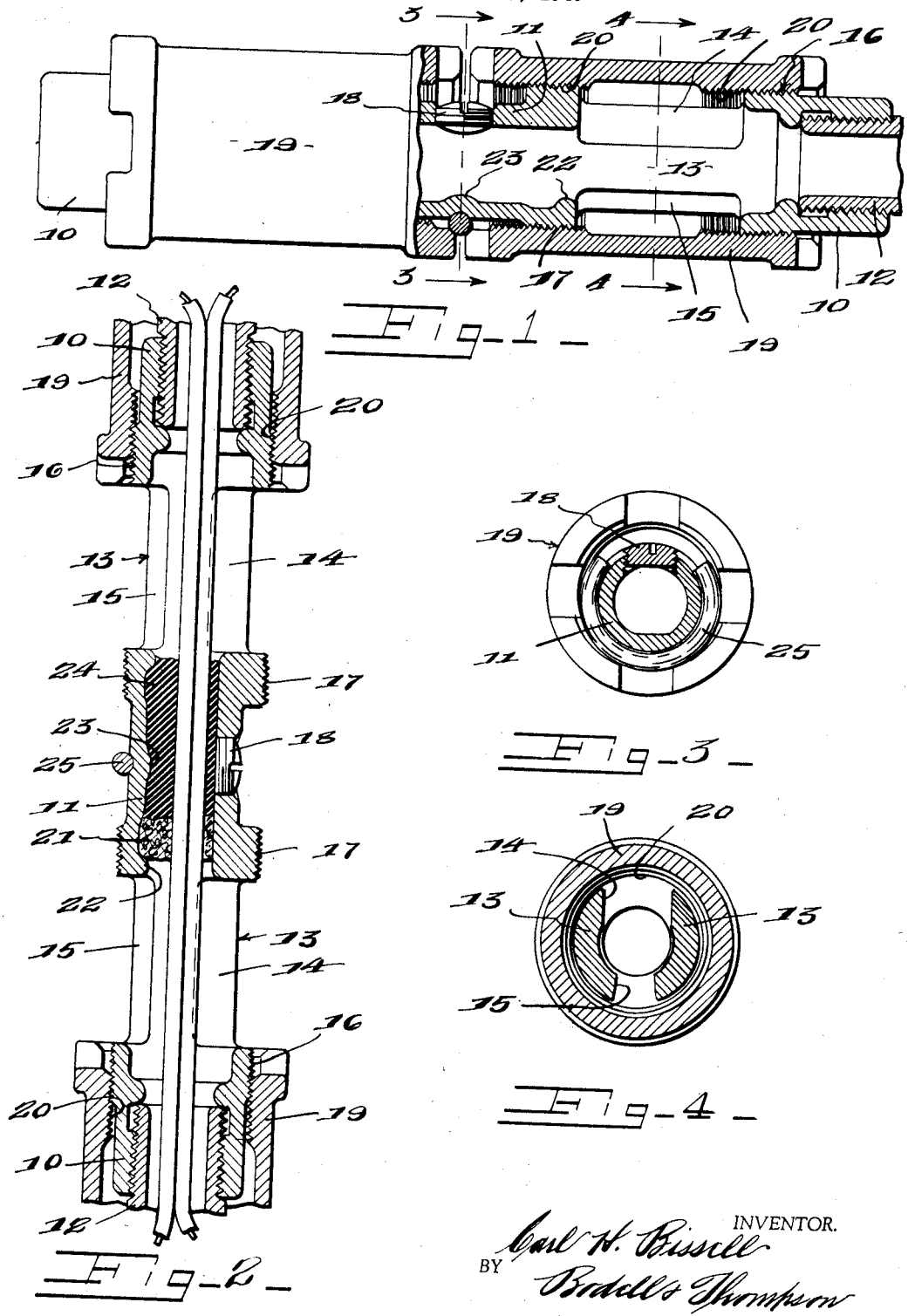
INVENTOR.
Carl H. Bissell
BY Biddle & Thompson
ATTORNEYS.

Patented Jan. 7, 1941

2,227,954

UNITED STATES PATENT OFFICE 2,227,954

CONDUIT SEALING FITTING

Carl H. Bissell, Syracuse, N. Y., assignor to Crouse-Hinds Company, Syracuse, N. Y., a corporation of New York Application March 8, 1940, Serial No. 323,002

5 Claims. (Cl. 285—205)

This invention relates to a sealing fitting for an electric conduit line.

The invention has as an object a sealing fitting of the type referred to embodying a particularly economical and compact structure which may be conveniently employed to seal both a vertical and horizontal conduit line.

The invention has as a further object a fitting of the type referred to embodying a structure which may be conveniently manipulated to expose the interior of the fitting, whereby access may be had thereto for the convenient installation of the sealing dam and the insertion of the sealing compound.

The invention consists in the novel features and in the combinations and constructions hereinafter set forth and claimed.

In describing this invention, reference is had to the accompanying drawing in which like characters designate corresponding parts in all the views.

Figure 1 is a side elevational view, partly in section, illustrating a sealing fitting embodying my invention.

Figure 2 is a lengthwise sectional view of the fitting shown in Figure 1 illustrating the arrangement of the parts when the fitting is opened for the reception of the sealing compound.

Figure 3 is a cross sectional view taken on line 3—3, Figure 1.

Figure 4 is a cross sectional view taken on line 4—4, Figure 1.

The invention comprises a substantially tubular body member formed with cylindrical end sections 10 and a central cylindrical section 11. The end sections 10 are provided with apertures to receive the ends of the conduit 12 and are connected to the central portion 11 by a pair of spaced apart wall sections 13. The wall sections 13 are of arcuate cross sectional form providing elongated side openings 14, 15. The outer cylindrical surface of the end portions 10 are threaded as at 16, and the central section 11 is formed with externally threaded cylindrical end portions 17.

In the embodiment illustrated, the threaded portions 16, 17 are of the same diameter and are provided with a running or continuous pitch thread. The central section 11 is provided with an aperture extending through the side wall thereof and in which is threaded a closure plug 18. The openings 14, 15 in each end of the body member are closed by a sleeve 19 provided with internal threads 20 complemental to the threads 16, 17.

A sleeve 19 is provided for each end of the body and when the sleeves are threaded on the end portions and the cylindrical portion 17 of the central section, they form a flame tight closure for the openings 14, 15. Each of the sleeves 19 may be threaded axially in a direction from the central section 11 exposing the openings 14, 15, as indicated in Figure 2.

The fitting is employed to seal off one section of a conduit system from another, and the fitting may be conveniently used for this purpose whether the conduit run extends in the vertical or horizontal position. If the conduit run is in the vertical position, both of the sleeves 19 may be unthreaded from the central section 11 to expose the openings 14, 15 on both sides thereof. The dam material 21 may be then conveniently arranged in the lower end of the central section, access being had thereto through the lower openings 14, 15. The bottom wall of the central section 11 is provided with internal projections 22 at the ends of the section, and a projection 23 arranged in the center thereof. The projections 22 aid in maintaining the temporary dam 21 in place, and the projections also aid in maintaining the sealing compound material 24 in the central section.

After the dam 21 has been inserted in the central section, the sealing compound 24 is placed in the upper portion of the section 11 through the upper exposed openings 14, 15. Inasmuch as access is had to both ends of the central section, the dam 21 and the sealing compound 24 can be quickly and properly inserted in the fitting. After the sealing compound 24 has been placed in the fitting, the sleeves 19 are then threaded toward the central section until the confronting ends are threaded onto the threaded portion 17. The central portion is provided with a snap ring 25 arranged in a centrally located groove and which serves as a stop to prevent the sleeves 19 being threaded too far on the central section 11.

When the fitting is arranged in a horizontal conduit run, the sleeves 19 are threaded off from the central section to expose the openings 14, 15, and the dam is arranged in each end portion of the central section 11 of the fitting. The dam may be extended between the walls 13. It will be observed that the opening 14 is substantially complemental in width to the bore of the body while the opposite opening 15 is restricted in width, this restriction serving to maintain the dam within the fitting. After the dams have been placed or formed in the outer end portions of the fitting, the sealing compound is poured through the aperture in the central section 11, and the aperture may be closed by the plug 18.

In either instance, the interior of the fitting may be completely exposed providing access thereto, whereby the dam and sealing compound may be conveniently and properly arranged in the fitting.

What I claim is:

1. A conduit sealing fitting comprising a tubular body member provided with a conduit receiving passage in each end thereof, said body being formed with an opening extending through the side wall adjacent each end thereof and an aperture arranged centrally of the body and also extending through the side wall thereof, a closure for said aperture detachably secured to the body in flame tight relation thereto and a closure for each of said openings, said closures being movable in an axial direction, and said closures and body member being provided with means cooperable to detachably secure the closures to the body in flame tight relation.

2. A conduit sealing fitting comprising a tubular member provided with means for attachment to a conduit, said body member being formed with an aperture arranged centrally of said body and extending through the side wall thereof, and said body being also formed with an opening arranged adjacent each end of the body and extending through the side wall thereof, a screw plug threaded into said central aperture, a sleeve encircling each end portion of the body, said sleeves being cooperable with the body to form a flame tight closure for the respective openings.

3. A conduit sealing fitting comprising a tubular body member formed with a conduit receiving passage in each end thereof, an aperture arranged centrally of the body and extending through the side wall thereof, a plug threaded into said aperture, said body being formed with a pair of spaced apart cylindrical externally threaded portions intermediate said aperture and each end of the body, and said body being formed with an opening arranged intermediate each pair of threaded portions, and a sleeve threading on each pair of said cylindrical portions and forming a flame tight closure for the adjacent opening in the body.

4. A conduit sealing fitting comprising a tubular body formed with cylindrical end sections and a central cylindrical section arranged intermediate said end sections, said central section being provided with an aperture extending through the side wall thereof, said body being formed with an opening arranged intermediate each end section and said central section and extending through the side wall of the body, and a sleeve extending from each end section to the central section, said sleeves threading on said sections and forming flame tight closures for said openings.

5. A conduit sealing fitting comprising a tubular body provided with means for attachment to a conduit and being formed with externally threaded cylindrical end sections and an intermediate externally threaded cylindrical central section, said central section being formed with an aperture extending through the side wall thereof, said body being formed with an opening arranged intermediate each end section and said central section, a sleeve extending from each end section to said central section and being threaded on said sections, the confronting ends of said sections overlying said aperture and said sleeves forming removable flame tight closures for said openings.

CARL H. EISSELL.